United States Patent [19]

Teshima et al.

[11] Patent Number: 4,941,104
[45] Date of Patent: Jul. 10, 1990

[54] NUMERICAL CONTROL APPARATUS FOR CONTROLLING A THREADING OPERATION

[75] Inventors: Takeo Teshima; Makoto Konno, both of Aichi, Japan

[73] Assignee: Mitsubishi Denki Kabushiki Kaisha, Tokyo, Japan

[21] Appl. No.: 186,858

[22] Filed: Apr. 27, 1988

[30] Foreign Application Priority Data

Apr. 27, 1987 [JP] Japan .................. 62-101748
Feb. 15, 1988 [JP] Japan .................. 63-30980

[51] Int. Cl.$^5$ .......................... G05B 19/24; B23G 1/04
[52] U.S. Cl. ................. 364/474.3; 364/474.31; 408/3; 318/573; 318/567; 318/569
[58] Field of Search ............... 364/474.15, 474.3, 183, 364/474.31; 318/39, 571, 567, 569, 573; 408/3–9, 10

[56] References Cited

U.S. PATENT DOCUMENTS

| | | | |
|---|---|---|---|
| 3,784,798 | 1/1974 | Beadle et al. | 364/474.15 |
| 4,353,018 | 10/1982 | Kohzai et al. | 318/571 |
| 4,629,956 | 12/1986 | Nozawa et al. | 318/625 |
| 4,656,405 | 4/1987 | Kiya et al. | 318/571 |
| 4,692,071 | 9/1987 | Hirota | 408/9 |

FOREIGN PATENT DOCUMENTS 62-80524 3/1987 Japan .
62-82128 4/1987 Japan .
62-215820 8/1987 Japan .

OTHER PUBLICATIONS

Van Nostrands Scientific Encyclopedia Definition of "Time Constant", 1968.

*Primary Examiner*—Jerry Smith
*Assistant Examiner*—Paul Gordon
*Attorney, Agent, or Firm*—Sughrue, Mion, Zinn, Macpeak & Seas

[57] ABSTRACT

An improvement in a numerical control apparatus for controlling a threading operation with a tap. A numerical control apparatus of the present invention which is simple in construction and needs no dummy mechanism such as a floating tapper; and which minimizes the drift of the tap in the bottom of a tapped hole by an instruction to a feed shaft which switches an acceleration or deceleration time constant, and a simultaneous instruction to a spindle device which controls the position of the spindle device. Thus, the machining precision of the bottom of the tapped hole is improved, and a high-speed tapping operation is possible. Furthermore, the numerical control device also is capable of preventing the tap and the threaded portion machined by the tap from being damaged upon an occurrence of an abnormal condition by an instruction from the removing control unit.

3 Claims, 3 Drawing Sheets

NUMERICAL CONTROL APPARATUS FOR CONTROLLING A THREADING OPERATION

BACKGROUND OF THE INVENTION

This invention relates to an improvement in a numerical control apparatus for controlling a tap threading operation.

FIG. 3 is a schematic diagram illustrating a device known in the art, capable of threading by a tap. In FIG. 3 reference numeral 1 designates a spindle; 2, a workpiece; 3, a cylindrical hole which is formed in the workpiece 2 in advance of the threading operation; 4, a cutter table; 5, a tap; 6, a floating tapper; and 7, an arrow.

In the threading operation, while the spindle 1 is rotated, the cutter table 4 is moved in a direction indicated by the arrow 7, so that the tap 5 is inserted into the hole 3 to thread the inner peripheral wall of the hole 3. To achieve highly precise tap-machining, synchronizing the rotation angle of the workpiece 2 is necessary; that is, the spindle 1 must be synchronized with the feeding amount of the cutter table 4 according to the thread pitch. Generally, however, the rotation control of the spindle 1 and the movement control of the cutter table 4 are performed independently by different servo-control systems. Consequently, a floating tapper 6 has been proposed which allows the tap 5 to move freely in a direction perpendicular to the rotation direction thereof to compensate for a synchronization error between the rotation angle of the spindle 1, and the feeding amount of the tap 5 during tap-machining. More specifically, with such a floating tapper 6, even if the feed of the cutter table 4 is stopped while the spindle 1 is being rotated, the tap 5 is extended and retracted according to the spindle rotation angle. In other words, by using the floating tapper, the tap may be moved so as to meet the spindle rotation.

FIG. 4 is a block diagram showing the arrangement of a conventional numerical control apparatus. In FIG. 4, reference numeral 11 is a machining data memory section for storing machining data: 12 is an interpolation preprocess section for receiving the machining data and performing an arithmetical process prior to interpolation; 13 is an interpolation process section for performing an interpolation according to the output of the interpolation preprocess section 12; 14 is an acceleration and deceleration process section for performing acceleration and deceleration according to the output of the interpolation process section 13; 15 is a feed device for performing position control according to a position instruction provided by acceleration and deceleration process section 14; 16 is a speed instruction process section for outputting a speed instruction according to the output of interpolation preprocess section 12; 17 is a spindle device for performing speed control according to a speed instruction provided by the speed instruction process section 16; and 18 is an emergency stop process section for producing and inputting a stop instruction to the above-described process sections in response to an emergency stop signal.

The threading operation using, for example, a tap, is performed in the manner described below. First, machining data concerning the tapping operation are inputted to the interpolation preprocess section 12 by the machining data memory section 11. Then, the interpolation preprocess section 12 inputs predetermined speed instruction data to the speed instruction process section 16 according to the machining data. Instruction process section 16 converts the speed instruction data and direction of rotation data into voltages, or the like, which are then inputted to the spindle device 17. Spindle device 17 rotates the spindle in a predetermined direction according to the voltages corresponding to the speed instruction data, and to the direction of rotation data.

The interpolation preprocess section 12 applies machining data such as an amount of linear movement of the tap in a threading direction to the interpolation process section 13. Interpolation process section 13 performs an interpolation process according to the machining data, and inputs a position instruction to the acceleration and deceleration process section 14. The acceleration and deceleration process section 14 performs an acceleration, or deceleration, process for the position instruction, which is then inputted to the feed device 15. The feed device 15 controls the work table position, or the like, according to the position instruction.

An operation of removing the tap from the threaded hole, i.e., reversing the direction of spindle 17 rotation, and reversing the direction of feed device 15 movement, are performed similarly to the above-described threading operation.

Generally, when an emergency stop signal is inputted to the emergency stop process section 18 from either the feed device 15, the spindle device 17, or an operator upon an abnormal condition occurring during the threading machining operation, the respective process sections and the devices are placed in an emergency stop condition by original emergency stop signals such that the tap 5 is inserted into the hole 3 continuously. After recovery from the emergency condition, the tap 5 then is removed from the hole 3.

In the conventional numerical control apparatus thus constructed, the inertia of the spindle 1 is larger than that of the feed device 15, and the position control of the spindle device 17 is disregarded. Therefore, in removing the tap 5 from the hole 3, the positional error of the feed shaft, with respect to the angle of spindle rotation determined by the thread pitch, becomes very large, thereby resulting in a severe rearward movement that may deform the shape of the thread.

The above condition will be described in more detail hereinafter. FIG. 5 indicates the spindle rotation speed and the feed speed of the feed device in a tapping operation. As apparent in FIG. 5, after an instruction is issued to turn the spindle 17 in the forward direction, or in the reverse direction, at time instant a, the feed by the feed device 15 is started, and at time b, the feed speed reaches a value determined by a thread pitch and a spindle rotation speed. During the time period between times a and b, the feed speed is smaller than the determined value and the tapping operation cannot be performed; that is, the time period corresponds to an air-cut. At time c, in response to an emergency stop instruction, the spindle and the feed device start decelerating. The spindle speed is decreased according to the inertia and torque. At time instant e, the spindle 17 is stopped.

In this case, since the inertia of the spindle 17 is larger than that of the feed device 15, the time period between when the spindle device 17 starts decelerating until it stops is longer by a period of d to e than the time period between when the feed device 15 starts decelerating until it finally stops. Furthermore, no position control instruction is given to the spindle device 17, and, therefore, after receiving the stop instruction, the spindle rotation speed is reduced linearly whereas the feed device feed speed is reduced exponentially. Accordingly, for the time period between when the deceleration is started and when the spindle 17, or the feed device 15, is stopped, the ratio of the spindle rotation speed to the feed speed of the feed device 15 varies. As a result, a synchronization error may occur between the spindle rotation speed and the feed speed, thereby resulting in thread deformation.

The tap removing operation will be described hereinafter. At time instant f, an instruction for reversing the direction of spindle rotation and an instruction for moving the tap in a reverse direction are provided. For the time period between time instants f and h, similarly to the time period between time instants c and e, the ratio of the spindle rotation speed to the feed device feed speed in the reverse direction cannot be maintained at the value determined by the thread pitch. In other words, the synchronization between the spindle rotation speed and the feed speed in the reverse direction is destroyed. The time period from time instant h to time instant i involves removing the tap. That is, at time instant i, the tap has been removed from the threaded hole. During the time period between time instant i and time instant j, the feed device 15 decelerates and stops. At time instant j, the tap removing operation is completed. As described above, upon removing the tap from the threaded hole, the synchronization between the spindle rotation speed and the feed speed thereof may be destroyed, resulting in deformation of the threaded hole.

In the above-described process, a dummy mechanism such as a floating tapper is commonly used so that deformation of the thread portion is eliminated. In the dummy mechanism, a mechanism such as a splined shaft is employed so that an axis of the feed device for mounting the tap can be extended or retracted. Defects which may be caused by the inertial rotation of the spindle are absorbed by the dummy mechanism.

However, the conventional tap-machining process using the floating tapper is disadvantageous because the tap-machining is performed dependent upon the spindle movement and, thus, the accuracy in the thread portion length is poor. Furthermore, since there is a tap between the spindle and the feed device, the dummy mechanism normally can absorb the defects caused by the spindle's inertial rotation, but it cannot absorb the distortion due to the spindle's inertial rotation when the movable portion of the dummy mechanism is positioned at either its extended position limit or its retracted position limit, or due to the movement of an axis of the feed device when the spindle rotation stops. As a result, the bottom of the tapped hole is not accurate because the tap drifts in the bottom. Since preventing the amount of tap drift in the bottom from exceeding the range of play of the tap is critical, performing high-speed tapping operations is impossible.

In order to eliminate the above-described difficulties, Published Unexamined Japanese Patent Application No. 58-50454 has proposed a control system in which a pulse signal which is generated by the rotation of an encoder coupled to the spindle, is used as a z-axis feed pulse to synchronize thereby the spindle rotation with the feed amount in a z-axis. This eliminates the need for a floating tapper. However, in this case, eliminating the drift of the tap may be possible in a normal condition, but the control that is performed is dependent upon the spindle rotation, and therefore, accuracy is reduced in the thread portion length. Furthermore, removing the tap from operation when an abnormal condition occurs is somewhat difficult and time-consuming.

Accordingly, an object of this invention is to solve the above-described problems of the prior art. More specifically, an object of the invention is to provide a numerical control apparatus which is simple in construction and needs no expensive dummy mechanism such as a floating tapper, and which minimizes the drift of a tap in the bottom of a tapped hole. Thus, machining accuracy of the bottom of the tapped hole will be improved, and high-speed tapping operation may be conducted. Furthermore, according to the present invention, the numerical control device is capable of preventing the tap, and a threaded portion machined by the tap, from being damaged when an abnormal condition occurs.

SUMMARY OF THE INVENTION

The above and other objects and features of the present invention are accomplished by a numerical control apparatus containing: a time constant switching unit for switching one of an acceleration time constant or deceleration time constant of a feed shaft in response to an instruction; a gain switching unit for switching a position loop gain of the feed shaft and the spindle according to an instruction; a position data conversion unit for multiplying position data by a predetermined coefficient, the position data being subjected to an arithmetical operation with the acceleration time constant or deceleration time constant selected by the time constant switching unit; a spindle device having a position loop control function, the position of the feed shaft being controlled with either the acceleration time constant or deceleration time constant selected by the time constant switching unit, and at the same time an output of the position data conversion unit being inputted to the spindle device to control the spindle device; and a removing control unit for producing a removing instruction to remove a tap on occurrence of an abnormal condition.

In the numerical control apparatus of the invention, the position loop gains of the spindle device and the feed device can be made to coincide during the tap-machining operation, resulting in a ratio of the position instruction data to the spindle device and to the feed device always being made constant. Synchronous control of the feed speed of the feed device and the rotation speed of the spindle device is possible thereby.

BRIEF DESCRIPTION OF THE DRAWING

In the accompanying drawings.

DETAILED DESCRIPTION OF THE PREFERRED EMBODIMENT

Figure 1:
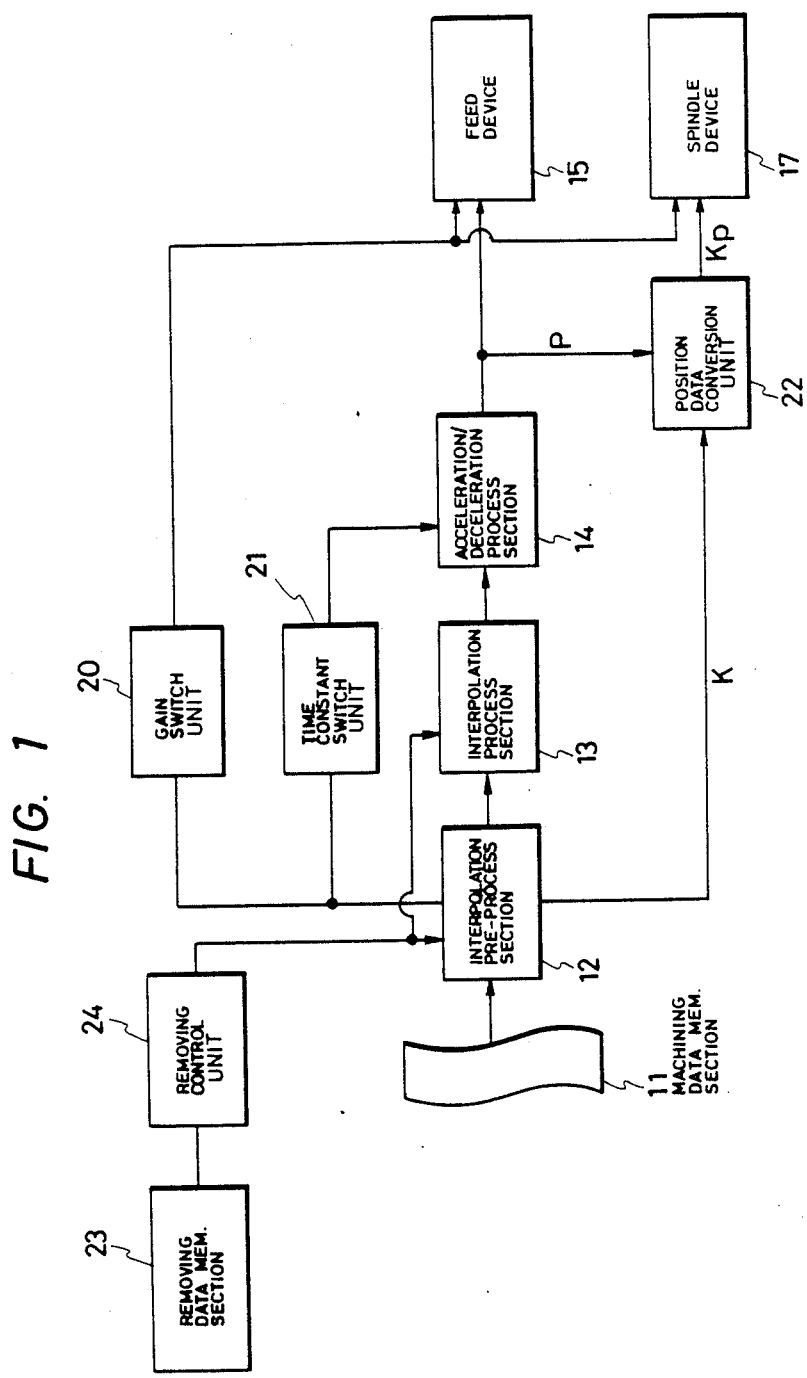
FIG. 1 is a block diagram showing one embodiment of this invention.
Figure 4:
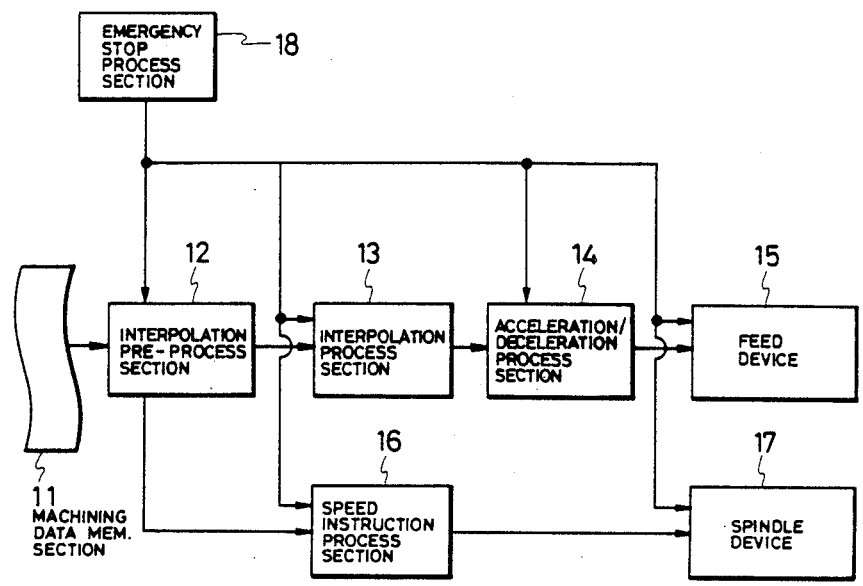
FIG. 4 is a block diagram showing one example of a conventional numerical control apparatus.
Figure 5:
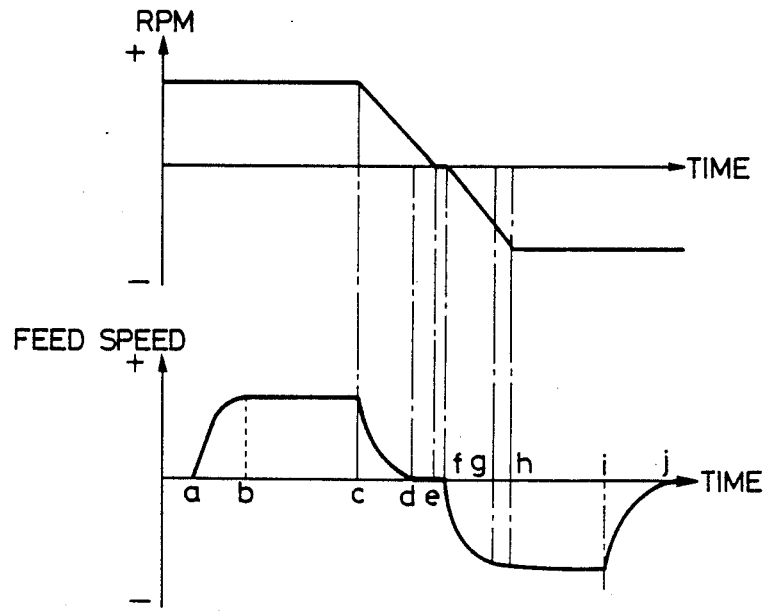
FIG. 5 is a graphical representation showing variations in the rotation speed of a spindle, and the feed speed of a feeding axis in the conventional apparatus of FIG. 4.

One embodiment of the invention will be described with reference to FIGS. 1 and 2. In FIG. 1, reference numerals 11 through 17 designate the same components as those in FIG. 4 and: 20 is a gain switching unit capable of switching the position loop gain of the feed shaft; 21 is a time constant switching unit for switching an acceleration or deceleration time constant of the feed shaft in response to an instruction; and 22 is a position data conversion unit in which a coefficient, k, provided by the interpolation preprocess section 12 and determined from the machining data, is multiplied by position data output by the acceleration and deceleration process section 14. The product of the multiplication is inputted to the spindle device 17. Reference numeral 23 denotes a removing data memory section for storing removing data; and 24 is a removing control unit which receives the data stored in the removing data memory section 23, when an abnormal condition occurs, and produces a removing instruction.

The operation of the numerical control apparatus thus organized will be described hereinafter. In a threading operation, for instance, with a tap, machining data on the tapping operation first are inputted to interpolation preprocess section 12 by the machining data memory section 11. Interpolation preprocess section 12 supplies data such as an amount of linear movement of the tap in the threading direction and feed speed of the feed device 15 to the interpolation process section 13 according to the machining data, and inputs switching instructions to the gain switching means 20 and the time constant switching means 21, respectively. Interpolation preprocess section 12 supplies the predetermined coefficient, k, to the position data conversion unit 22. Gain switching unit 20 switches the gain of the feed device 15 to a value equal to the position loop gain of the spindle device 17. The time constant switching unit 21 switches the time constant of the acceleration and deceleration process section 14 so that the spindle device 17 may not move forward during acceleration or deceleration. The interpolation process section 13 performs an interpolation process according to the output of the interpolation preprocess section 12, and inputs the result of the interpolation process to the acceleration and deceleration process section 14. The acceleration and deceleration process section 14 utilizes the time constant provided by the time constant switching section 21 to accelerate or decelerate the output of the interpolation process section 13 to obtain a position instruction. The position instruction thus obtained is inputted to the feed device 15 and the position data conversion means 22. The feed device 15 moves according to the position instruction from the acceleration and deceleration process section 14. In the position data conversion unit 22, the position instruction from the acceleration and deceleration section 14 is multiplied by the predetermined coefficient provided by the interpolation preprocess section 12. The product of the multiplication is applied to the spindle device 17. Accordingly, spindle device 17 moves according to the position data provided by the position data conversion unit 22.

A tap removing operation is performed in a similar manner. In response to a removing signal produced when an abnormal condition occurs, the removing data control unit 24 retrieves data from the removing data memory section 23 necessary for removing the tap from the threaded hole such as the amount of linear movement and the feed speed of the feed device 15, and the like. Then, the removing control unit 24 produces the removing instruction to the interpolation preprocess section 12. Additionally, the removing control unit 24 applies an interpolation stop signal to the interpolation process section 13, thus interrupting the interpolation operation. The interpolation preprocess section 12 cancels the tap machining data obtained from the machining data memory section 11, and outputs the data received from the removing control unit 24, such as the amount of linear movement and the feed speed of the feed device 15, to the interpolation process section 13. In this case, the gain and the time constants are not switched, and thus those which have been set for the tap-machining are used continuously. Based on the input from the interpolation preprocess section 12, the interpolation process section 13 performs the interpolation operation and outputs data to the acceleration/deceleration section 14. The removing operation is completed similarly to the threading operation described above.

Figure 2:
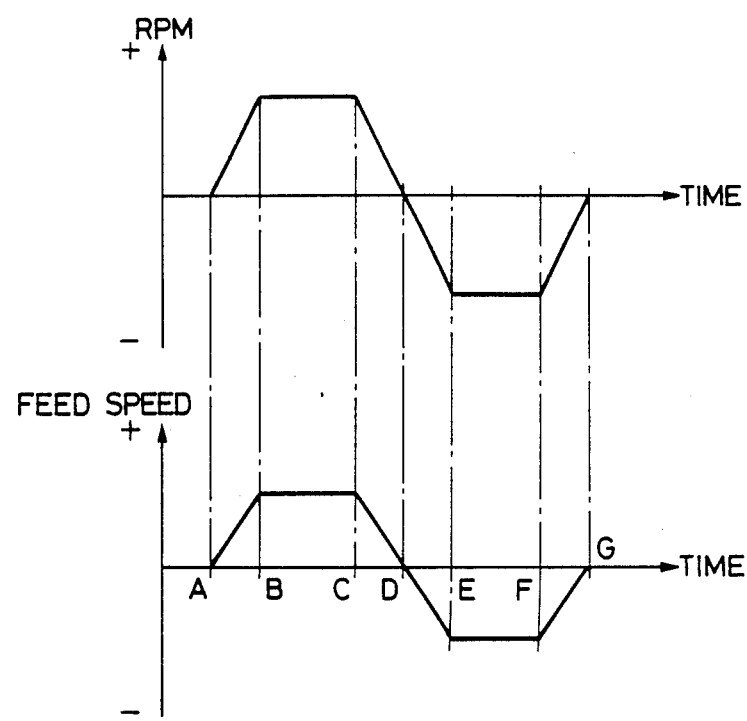
FIG. 2 is a graphical representation showing variations in the rotation speed of a spindle and the feed speed of a feed shaft in the embodiment of FIG. 1.
Figure 3:
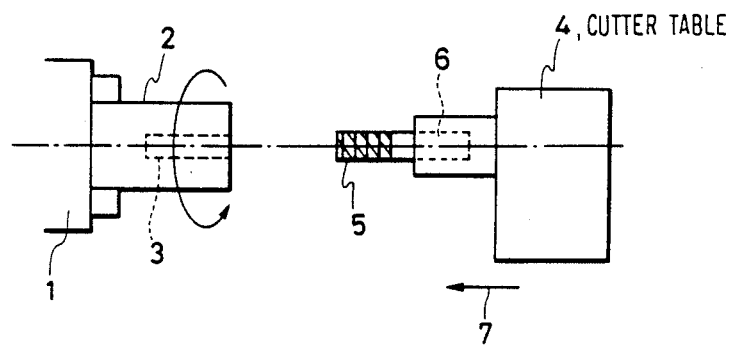
FIG. 3 is a schematic diagram illustrating a threading device using a tap.

FIG. 2 is a graphical representation showing an example of the variation in the rotation speed of the spindle 17 and the feed speed of the feed device 15 in a tapping operation with the numerical control apparatus of the present invention. In response to a tapping instruction made according to the machining data, the gains of the feed device 15 and the spindle device 17, and the time constant of the acceleration or deceleration processing are switched by the gain switching unit 20 and the time constant switching unit 21, respectively, the acceleration/deceleration process section 14 outputs a position instruction at time instant A to the feed device 15 so that the feed device 15 accelerates or decelerates. Simultaneously, the position instruction is inputted from the acceleration/deceleration processing section 14 to the position data conversion unit 22 in which it is multiplied by a predetermined coefficient. The multiplication product is applied to the spindle device 17, and the spindle device 17 begins to rotate.

At time instant B, the acceleration of the spindle device 17 and the feed device 15 is completed. Until time instant C, the spindle rotates at a constant rotation speed and the feed device 15 feed speed is also maintained. Upon receiving the tap removing signal at time instant C, the spindle device 17 and the feed device 15 start decelerating until time instant D. Simultaneously, the amount of movement of the feed device 15 to a tapping operation start point is calculated.

The tap removing operation is similar to the above-described tapping operation except that the spindle device 17 is rotated in the reverse direction, and the direction of feed by the feed device 15 also is reversed.

In the above-described tapping operation; i.e., the time period from time instant A to time instant G, the ratio of the spindle device 17 rotation speed to the feed device 15 feed speed always is constant, and the ratio is equal to a predetermined constant k which is multiplied in the position data conversion means 22. The ratio has these characteristics for the following reasons:

(1) A value obtained by multiplying the position instruction to the feed device 15 by the predetermined constant, k, is applied to the spindle device 17.

(2) The acceleration or deceleration time constant is determined so as not to exceed the acceleration determined by the inertia and torque of the spindle device 17.

(3) The position loop gains of the spindle device 17 and the feed device 15 are equal to each other.

The predetermined constant k representing the ratio of the spindle device 17 rotation speed to the feed device 15 feed speed can be represented by the following equation (1):

$$k = 1/P \qquad (1)$$

where the units for k are (the number of revolutions)/(unitary distance), and P is the thread pitch, the units for which are (unitary distance)/(the number of revolutions).

In the above-described embodiment, the timing of the removing operation may be expressed as follows: only when an abnormal condition occurs during the threading operation during the time period from time instant A to time instant C as shown in FIG. 2, may the tap removing operation be performed. During the time period from time instant C to time instant G, the removing operation cannot be performed.

Furthermore, during the tap removing operation, the interpolation preprocess section 12 may store the data for threading, and detect automatically whether further machining is required when the operation is restarted.

Additionally, since the removing data is stored in advance in the above-described embodiment, a distance from time instant A to time instant D may be calculated automatically when the rotation and the movement stop at time instant D after an abnormal condition occurs, and the removing operation then is performed based upon the product of the calculation.

Moreover, according to the present invention, if an emergency stop instruction is issued during the tap machining, the deceleration type of the feed shaft is set to the position loop deceleration step mode so as to match the feed shaft time constant with the spindle time constant. Accordingly, matching the distance from the deceleration start point to the stop point is possible. Thereafter, the removing operation can be performed similarly as above. In the above-described embodiment, the acceleration and deceleration process section 14 is of the linear acceleration and deceleration type. However, an exponential acceleration and deceleration type may be used instead.

Furthermore, the position instruction inputted to the feed device 15 is multiplied by the predetermined coefficient, and the multiplication product is inputted to the spindle device 17. However, the apparatus may be modified as described hereinafter. The interpolation process section 13 inputs to the acceleration and deceleration process section the amount of movement, the feed speed of the feed device 15, and the angle of rotation and the number of revolutions of the spindle device 17. The results thereof in the acceleration and deceleration section process 14 then are inputted to the feed device 15 and the spindle device 17, respectively. This modification has the same effect as the above-described embodiment.

As apparent from the description above, the present invention has the following advantages:

(1) Using an expensive dummy mechanism such as a floating tap chuck is unnecessary;

(2) The drift of the tap in the bottom of the tapped hole is prevented, thereby making high-speed removal of the tap possible. Accordingly, upon restarting the machining operation, performing the machining with the same machining pitch as before is possible, and thus deformation of a workpiece is prevented:

(3) Since the acceleration and deceleration of the spindle device 17 and the feed device 15 is accomplished with a time constant equal to that of the tap-machining high speed tap-machining becomes possible; and (4) If an abnormal condition occurs, recovery can be accomplished easily and rapidly, and a highly precise tapping operation still results. Furthermore, since the acceleration and deceleration of the spindle device 17 and the feed device 15 are performed with the tapping time constant, the tapping operation can be achieved rapidly, and much faster than with a conventional numerical control apparatus.

What Is Claimed Is:

1. A numerical control apparatus for controlling a control shaft and a spindle of a machine device according to machining data comprising:

time constant switching means for switching an acceleration or deceleration time constant of said control shaft in response to an instruction;

gain switching means for switching a position loop gain of said control shaft according to an instruction;

position data conversion means for multiplying position data by a predetermined coefficient, said position data being subjected to arithmetic operation with a time constant selected by said time constant switching means; and a spindle device having a position loop control function, the position of said control shaft being controlled with the time constant selected by said time constant switching means and at the same time an output of said position data conversion means being applied to said spindle device to control said device.

2. The apparatus of claim 1 further comprising means for removing a machining element automatically upon an occurrence of abnormal condition.

3. The apparatus of claim 2 wherein said machining element is a tap for threading.

* * * * *